United States Patent [19]

Evans et al.

[11] Patent Number: 5,006,424
[45] Date of Patent: Apr. 9, 1991

[54] BATTERY USING A METAL PARTICLE BED ELECTRODE

[75] Inventors: James V. Evans, Piedmont; Gultekin Savaskan, Albany, both of Calif.

[73] Assignee: The Regents of the University of California, Oakland, Calif.

[21] Appl. No.: 433,475

[22] Filed: Nov. 8, 1989

[51] Int. Cl.$^5$ .............................................. H01M 8/04
[52] U.S. Cl. ......................................... 429/15; 429/17; 429/27; 429/81
[58] Field of Search ..................... 429/15, 17, 19, 27, 429/70, 72, 81

[56] References Cited

U.S. PATENT DOCUMENTS

| | | | |
|---|---|---|---|
| 3,879,225 | 4/1975 | Backhurst et al. | 429/15 X |
| 3,887,400 | 6/1975 | Doniat et al. | 429/15 |
| 3,981,747 | 9/1976 | Doniat et al. | 429/15 |
| 4,126,733 | 11/1978 | Doniat | 429/12 |
| 4,147,839 | 4/1979 | Solomon et al. | 429/15 |
| 4,198,475 | 4/1980 | Zaromb | 429/15 |
| 4,218,520 | 8/1980 | Zaromb | 429/15 |

*Primary Examiner*—Anthony Skapars
*Attorney, Agent, or Firm*—Flehr, Hohbach, Test, Albritton & Herbert

[57] ABSTRACT

A zinc-air battery in a case including a zinc particle bed supported adjacent the current feeder and diaphragm on a porous support plate which holds the particles but passes electrolyte solution. Electrolyte is recycled through a conduit between the support plate and top of the bed by convective forces created by a density of differential caused by a higher concentration of high density discharge products in the interstices of the bed than in the electrolyte recycle conduit.

9 Claims, 4 Drawing Sheets

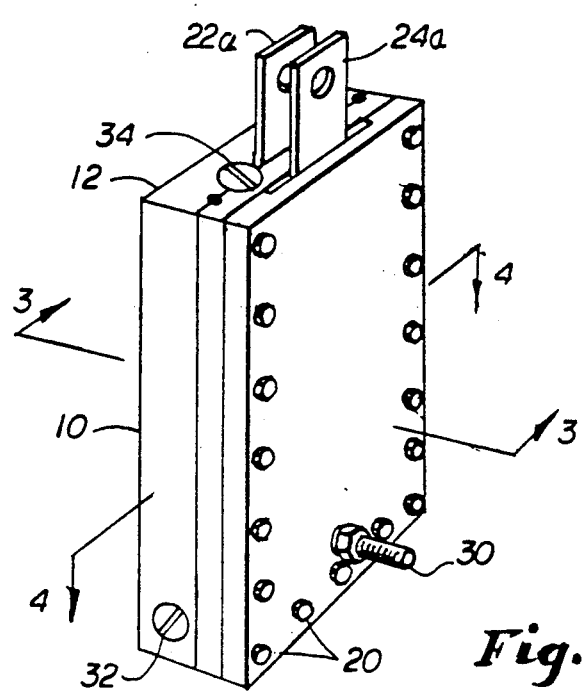
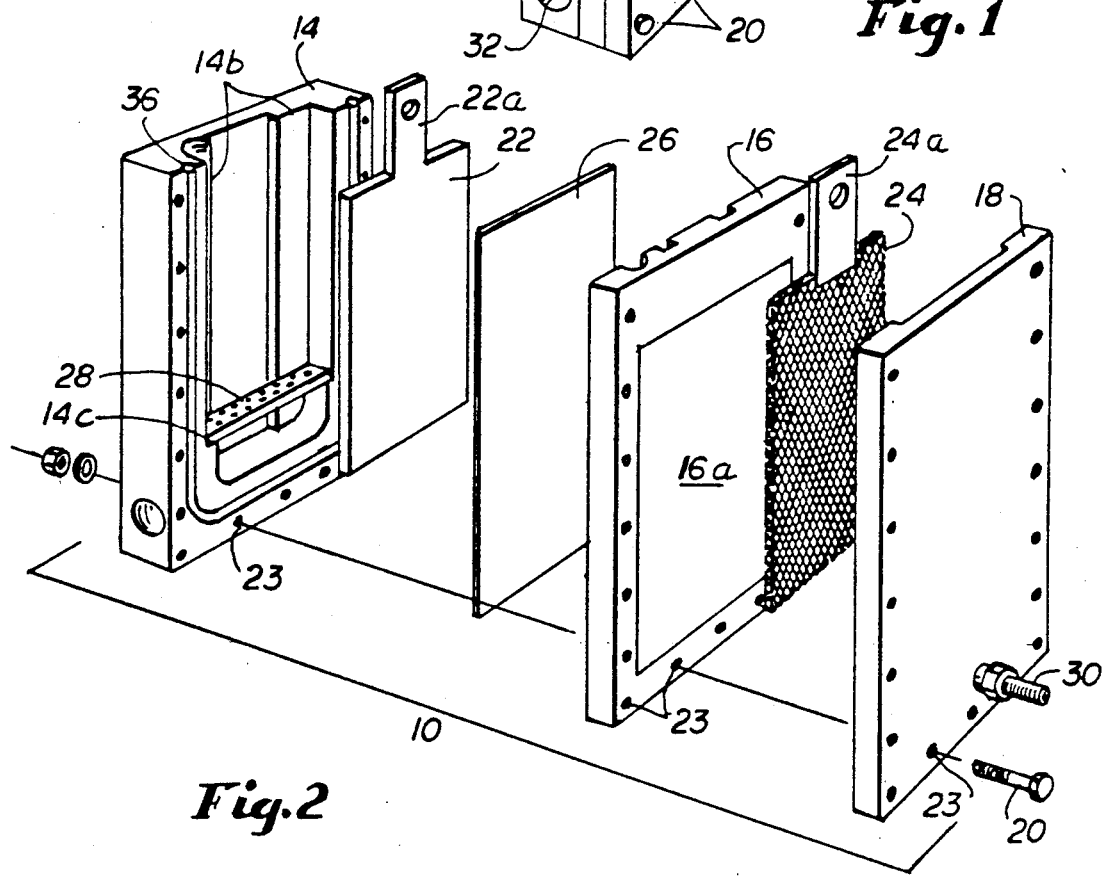

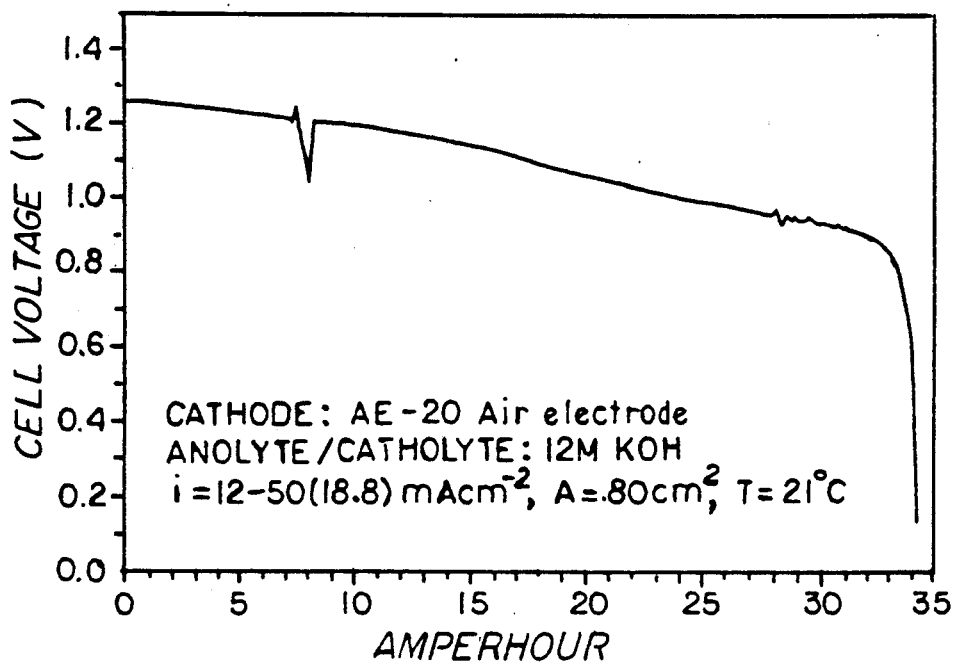
Fig.5 CELL VOLTAGE vs Ah
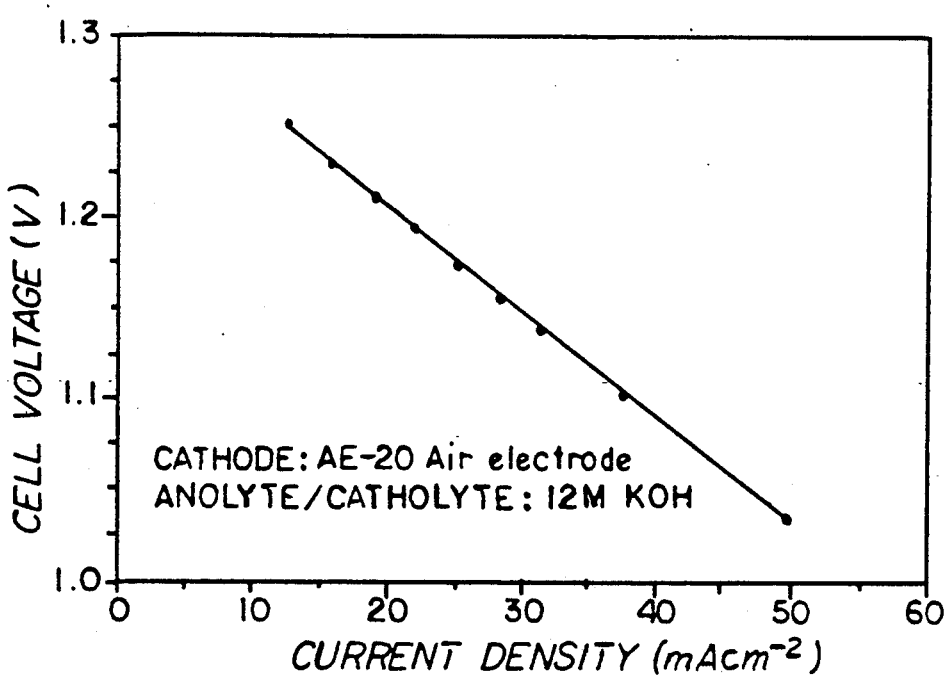
Fig.6 CURRENT DENSITY vs CELL VOLTAGE AFTER 7.5 AH DISCHARGE AT $18.8 mAcm^{-2}$

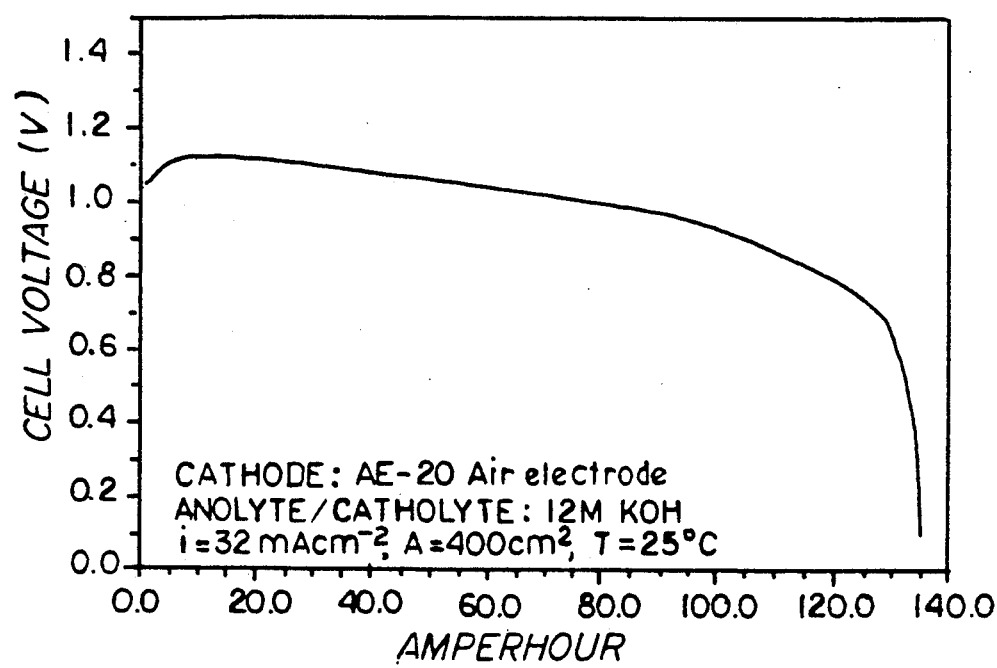
Fig. 7 VOLTAGE vs. Ah

BATTERY USING A METAL PARTICLE BED ELECTRODE

GOVERNMENT CONTRACT INFORMATION

The U.S. Government has a paid-up license in this invention and the right in limited circumstances to require to license others on reasonable terms as provided for by the terms of Contract No. DE-AC03-76SF 00098 awarded by the U.S. Department of Energy.

BACKGROUND OF THE INVENTION

The invention relates to rechargeable batteries, particularly of the zinc-air cell type. More specifically, the invention relates to a battery having an anode comprising a replaceable stationary zinc particle bed with recirculating electrolyte.

Zinc-air primary (non-rechargeable) cells are known, such as Sauer, et al. U.S. Pat. No. 4,115,626. Secondary (rechargeable) zinc-air cells are known as well. For example in Ross, U.S. Pat. No. 4,842,963, a battery is disclosed using a porous foam electrode containing deposited zinc. Electrolyte is recirculated through the electrode using an external pump and electrolyte reservoir.

Other approaches to a rechargeable zinc-air battery are disclosed in a series of Doniat, et al. U.S Pat. Nos. 3,887,400, 3,981,747, and 4,126,733. In these systems, a bed of zinc particles is fluidized by the passage of electrolyte upwardly through the bed under the influence of a pump. The patent discloses various techniques for electrochemically regenerating the zinc in situ.

A problem with each of the foregoing rechargeable batteries relates to pumping electrolyte in external recirculation loops. The pumps consume substantial energy and add considerable weight to the battery. This is a particular disadvantage for electric vehicles which would use a large numbers of such cells.

It would be highly advantageous to provide a rechargeable battery which can be rapidly recharged at home or at a service station and yet which would provide excellent performance characteristics. Moreover, it would be desirable to provide such a battery which eliminates external electrolyte reservoirs and circulator loops powered by energy-consuming pumps.

SUMMARY OF THE INVENTION

In accordance with the present invention, a battery is provided in which an active metal (preferably zinc) electrode in the form of a metal particle bed is disposed adjacent to a diaphragm in a battery case. A preferable counter electrode is a monofunctional air electrode.

The zinc particle bed is supported adjacent a current feeder and diaphragm. Preferably the particles include an external coating of zinc or zinc alloy around central cores. An electrolyte outlet proximal the lower end of the bed includes openings large enough to pass electrolyte solution but small enough to block passage of the zinc particles. An electrolyte inlet is provided for the upper end of the zinc particle bed. Electrolyte is recycled through a conduit and storage means disposed in the battery case between the electrolyte outlet and inlet by natural convective forces. As used herein, the term "natural convection" means electrolyte flow caused solely by density differences.

According to the method of the present invention, the metal in the above cell is dissolved from the surface of the metal particles into the electrolyte to generate a current in the current feeder and form high density suspended or soluble metal discharge products in the electrolyte. The electrolyte flows downwardly and out of the lower end of the bed with the particles being retained. The electrolyte is recycled upwardly through the conduit and storage means to the upper end of the particle bed. The flow is caused by natural convective forces created by a density differential caused by a higher concentration of such high density discharge products in the interstices of the bed than in the electrolyte recycle conduit.

BRIEF DESCRIPTION OF THE DRAWINGS

FIG. 1 is a side elevational view of the battery cell according to the invention.

FIG. 2 is an exploded view showing the components of the device of FIG. 1.

FIGS. 5–7 illustrate sample performance characteristics of cells according to the invention.

DETAILED DESCRIPTION OF THE INVENTION

Figure 4:
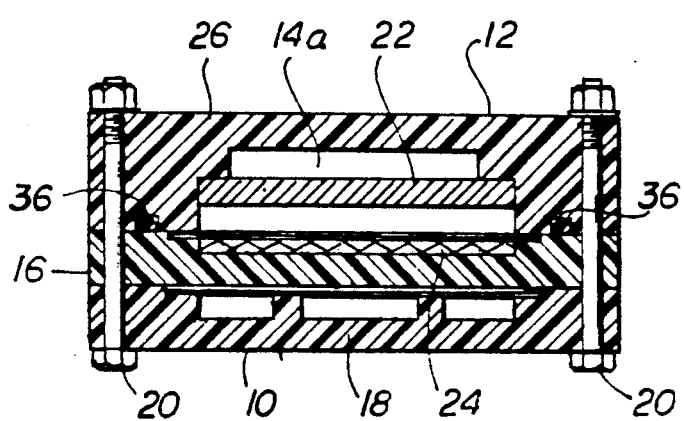
FIG. 4 is a cross-sectional view of the cell of FIG. 1 taken along the lines 4—4.

The invention is a battery which employs a stationary metal particle bed as the active anode. For simplicity, the invention will first be described in terms of a preferred embodiment - a zinc-air cell using a bed of zinc coated particles as the active material in the anode.

The term "battery" or "zinc-air battery" or "metal-air battery" broadly includes a number of battery cells each of which contains an active metal anode of the type described hereinafter. In addition, it includes a single cell. The term "cell" means only a single cell.

An essential element of the present invention constitutes a bed of active metal particles as the anode. A preferred form of the metal particles in the bed includes an outer coating of active metal on cores of conducting material such as copper or graphite or chemically or electrically inert material such as glass or plastic. The size of the particles can vary typically from about 0.1 to 1 mm in any convenient form such as spheres or shots. The coating can be performed by conventional techniques such as barrel plating or electrodeposition in a fluidized bed electrode to a desired thickness of 50 um to 500 um. Such metal particles can also include the same metal in the core as on the surface. However, one disadvantage of such particles is that during discharge, fines are generated which become difficult to remove during recharging.

Zinc is the preferred anode, particularly when used in combination with an alkaline electrolyte, e.g. potassium hydroxide solution, because of its high theoretical specific power and specific energy; and its ease of regeneration as discussed in the previous paragraph. Thus, the preferred coating is zinc or a zinc alloy. Accordingly, the present description will refer to zinc as the active metal. As used herein, "zinc" will include zinc metal or a zinc alloy. However, in certain applications other active metal such as aluminum may be employed as the anode. For simplicity, the present description will refer to a bed of zinc particles as the active metal in the anode.

Referring to FIGS. 1 and 2, a zinc-air cell 10 is illustrated including case 12 defined by a bed frame 14, an air electrode support frame 16, (supporting monofunctional air electrode 16a) and an air electrode backplate 18, suitably bolted together by a number of bolts 20 extending through bolt holes 23. Cell 10 also includes a current feeder 22 (illustrated as a rectangular self-supporting graphite wall) with an upwardly projecting conductive tab 22a, a metal mesh current collector 24 with an upwardly projecting metal tab 24a, and a separator or diaphragm 26 disposed between support frame 16 and current feeder 22.

The anode or zinc electrode is comprised of bed frame 14, current feeder 22, and the bed of zinc particles 27 (illustrated in FIG. 3) supported on electrolyte outlet means proximal to the lower end of the bed in the form of a perforated bed support 28.

An air or oxygen inlet nipple 30 is provided for hookup to a suitable source, not shown. An electrolyte drain 32 is provided through the lower end of the outside wall of bed frame 14. In addition, an opening for particles with a removable cap 34 is provided in the top wall of bed frame 14 above particle bed 27 and in communication with such bed to provide ready access to a vacuum probe to draw out the particles when they have become passivated after discharge. Then, a fresh particle bed can be deposited through the particle opening onto the bed support. Electrolyte can also be replaced through the capped opening followed by cap replacement. A resilient U-shaped gasket 36 is provided around the anode for sealing contact with the facing side wall of support frame 16.

The components of case 12 may be formed of any strong chemically inert insulation material, e.g. plastic materials conventionally used for alkaline batteries.

As illustrated, bed support 28 is in the form of an elongate inert plastic support strip having a number of ports formed as by drilling. The ports are smaller than the metal particles but large enough to pass electrolyte solution. Suitable openings for this purpose are on the order of one half of the particle diameter after discharge. In the illustrated embodiment, bed support 28 rests on shoulders 14c formed at opposite sides of a recess in bed frame 14.

Figure 3:
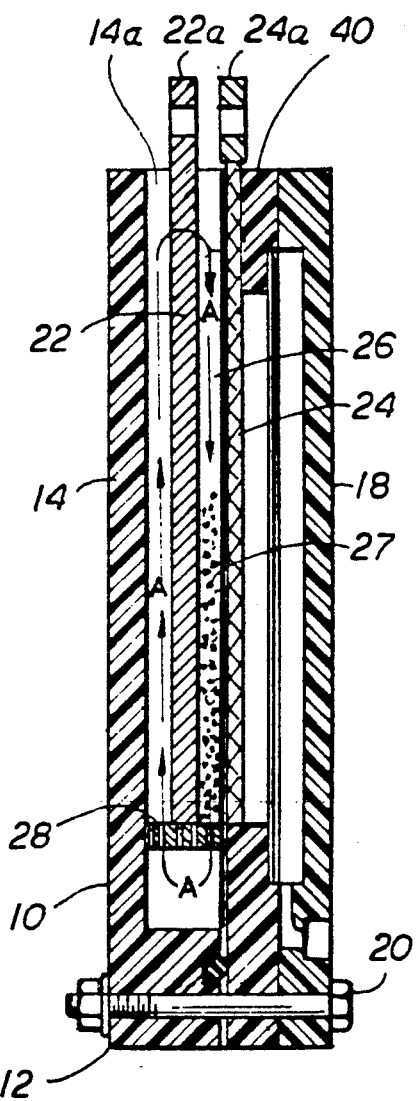
FIG. 3 is a cross-sectional view of the cell of FIG. 1 taken along the lines 3—3.

Bed frame 14 defines a vertically disposed generally rectangular slot or chamber 14a defining electrolyte conduit and storage means or area on the outside of current feeder 22 as illustrated in FIGS. 2 and 3. Current feeder 22 rests on bed support 28 flush against interior wall portions 14b of bed frame 14. Current feeder 22 projects upwardly through a slot formed between the top wall of bed frame 14 and support frame 16. An electrolyte inlet opening to the top of the particle bed is created by the opening on both sides of tab 22a below the top of case 12.

Electrolyte also is stored in the open bottom recess of bed frame 14 below bed support 28. Electrolyte is also contained in chamber 14a best illustrated in FIG. 4 in an area defined by the back wall of bed frame 14 and the side of current feeder 22 opposite the diaphragm. Open chamber 14a defines an electrolyte recirculation conduit path and storage area with sufficient electrolyte storage capacity for the desired long-term output of the cell. The ratio of the volume of chamber 14a and that of bed 28 may be varied to a significant extent depending upon the amount of zinc in the particle bed. A suitable ratio is on the order of an equal volume of chamber 14a per unit volume of particle bed 27.

Current collector 24 is supported by a rib portion 40 of backplate 18 pressing the main body of the collector against the adjacent support frame 16 Diaphragm 26 is flush against support frame 16.

A suitable cathode is of the monofunctional air electrode type. As used herein, the term monofunctional means that the air electrode is designed for use only during the discharge of the cell. Such cathodes are commercially available and are typically carbon based. A suitable cathode is sold under the trade designations AE-20 or A-100 as supplied by Electromedia Corporation. The cathode has a backing plate with one or more air or oxygen inlet ports such as nipple 30.

Air electrode backing plate 18 is formed of insulating material such as polypropylene which acts to space air electrode 16a from the side wall of case 12 as well as to permit the flow of air to air electrode 16a through grooves molded into the side surface of backplate 18 facing air electrode 16a.

The current feeder 22 and collector 24 are inert to the electrolyte used and highly conductive. Suitable highly conductive material such as graphite and Ni-Exmet or plate are suitable for use as current feeders. Similarly, expanded metal mesh materials sold under the trademarks Ni-Exmet and Copper-Exmet by Eltech Corp. are suitable for use as current collectors. As illustrated, the current feeder is a solid graphite plate while the current collector is a nickel mesh.

A diaphragm or separator is formed of a porous insulation material. For example, a porous material such as the porous plastic sold under the trademark Daramic by W. R. Grace Corporation may be employed.

The electrolyte used in the cell or battery should have both high conductivity and high solubility for the metal discharge products. For a zinc anode in an alkaline electrolyte, the electrolyte should have a high solubility for zincate ion. For this purpose, the best electrolytes are those based on concentrated potassium hydroxide with additives that improve zincate solubility, e.g. potassium silicate and sorbitol. Examples of electrolytes having the desired properties are those described by Foller in the Journal of Applied Electrochemistry, Vol. 16 (1986) at p. 527. One particularly effective electrolyte is about 7–14M potassium hydroxide with one or more additives to increase the solubility of zincate including silicates, sorbitol, and lithium hydroxide.

In operation of the zinc air-cell 10, electrolyte and the zinc particles may be supplied to the anode by pouring through the inlet opening with opening cap 34 removed. Then the cap is replaced to seal the battery. The zinc coating is dissolved from the surface of the zinc particles into the electrolyte to generate a current in current feeder 22. Simultaneously, soluble or suspended metal discharge products are dissolved in the electrolyte to form a high density electrolyte solution in the interstices of the particles in the bed. This solution has a higher density than the solution in the electrolyte recycle conduit of chamber 14a. Convective forces are created by this density differential so that the electrolyte flows downwardly through bed support 28 and back upwardly through chamber 14a in a path designated by arrow A in FIG. 3. Convection flow carries the electrolyte upwardly and over the top of current feeder 22 and back downwardly to the top of particle bed 27 to dissolve further zinc.

The convective forces will continue to cause the recycle of electrolytes so long as there is a sufficient difference in density between the electrolyte at the interstices of the metal particle bed and the electrolyte in the recycle chamber on the opposite side of the current collector. A suitable difference in density between the middle of the particle bed and the middle of the recycle conduit is on the order of 20 kg/m$^3$ to 200 kg/m$^3$ to accomplish this convective pumping without external pumping means. An important advantage of this system is the elimination of any external pumping means. However, if desired for specific applications, an auxiliary pump of reduced capacity may be used in combination with such convective forces. Suitable operating conditions of a typical cell are in the temperature range of about 20°–60° C. at superficial current densities of up to 100 mA.cm$^{-2}$.

While the above system has been described in terms of the preferred embodiment using an air electrode as the cathode, it should be understood that other cathodes, including metal cathodes, may also be employed so long as an anode of the above general type is used. Also, other forms of electrolyte recycle may be employed in place of the conduit formed between the conductor plate 22 and chamber 14a. For example, the recycle may be performed in a chamber, not shown, to the side of current feeder 22 so long as the recycle is in contact with sufficient electrolyte for the current to be provided to maximize the life of the battery. Other alternatives of the batteries and cells may be used so long as they take advantage of the structure which enables natural convective recycle of an electrolyte through a stationary active metal particle bed.

The battery as disclosed combines the features of an improved uniform rechargeable battery without the necessity of an external electrical pump. In addition, it permit rapid recharging by merely removing the particle bed with an appropriate vacuum attachment. Moreover, the electrolyte may be removed through the same opening or through a lower drain as desired.

The following examples are for the purpose of illustrating the present invention.

EXAMPLE 1

In this example, zinc coated copper particles are produced using the apparatus described in Jiricny & Evans, Metallurgical Transactions, Vol 15B, p. 624 (December 1984). The following solutions and conditions were used.

analyte: 10M KOH
catholyte: 10M KOH+25 g/l silicate
temperature: room temperaure (22° C.)
bed height: 12 cm
current: 15 amps
time: 156 minutes

EXAMPLE 2

In this example, electrical behavior of a cell constructed in accordance with the present invention is described. The anolyte was 45 ml 10 M KOH and 27 g/l silicate and 15 g/l sorbitol while the catholyte was 15 ml of 10M KOH. An air electrode was used. Current density was 12.5 mA/cm$^2$ at a temperature of 20° C. The bed was formed of 67 g of zinc coated copper particles with 6.5 g of zinc.

A cell as illustrated was filled with the particles and assembled. A porous diaphragm of the Daramic type was used with a monofunctional air electrode supplied by Electromedia Corporation under the designation AE-20 and a current collector of 0.25 mm thick Ni-Exmet. The anolyte and catholyte compartments were filled with electrolyte. Air was supplied from a compressed air source and an open circuit potential was measured. A computer-controlled current regulator was set to 1 amp and a time v. voltage curve was recorded. The current regulator was programmed to turn the current to zero amps when cell voltage reached 0.05 volts. Decay in voltage was very low resulting in high coulombic efficiency without significant reduction in voltage.

EXAMPLE 3

The performance of a zinc-air cell based on the cell of Example 2 was compared to one of the type described in Ross, Jr. U.S. Pat. No. 4,842,963. The following Table 1 compares the predicted values of batteries based on the two designs. Moreover, as illustrated in Table 2, high values of Amp hours/liters have been achieved in the cell of the present invention without the use of additives.

TABLE 1

Characteristics of a 32 kWh Zinc-Air Alkaline Battery Advanced Technology

| Design Parameters | Ross (U.S. Pat. No. 4,842,963) | Example 2 |
| --- | --- | --- |
| Voltage (V) | 1.25 | 1.15 |
| Current Density (mA.cm$^2$) | 20.00$^a$ | 20.00 |
| Electrolyte Capacity (Ah/l) | 220.00$^b$ | 582.00 |
| Electrolyte Weight (Kg) | 200.00 | 83.00 |
| Zinc weight (Kg) | 31.20 | 33.90 |
| Auxilliary weights (Kg) (pumps, manifold, substrate, frame, air electrode, air scrubbers) | 64.00 | 64.10 |
| Total weight (Kg) | 295.20 | 181.00 |
| Energy density (Wh/Kg) | 108.40 | 177.00 |
| Power density (W/Kg) | 132.00$^d$ | 180.00$^e$ |

$^a$Assumed
$^b$Taken from literature
$^c$Achieved in a cell 80 cm$^2$ w/additives
$^d$Peak power density
$^e$Calculated using 83 mWcm$^{-2}$ peak power

TABLE 2

Capacity Comparison of Zinc-Air Alkaline Batteries

| Source | Condition | Capacity (Ah/l) |
| --- | --- | --- |
| Example 2 | 12M KOH without any additives at 32.2 mAcm$^{-2}$ discharge rate | 536 |
| Foller[1] | 12M KOH + additives (SiO$_2$ + LiOH) at 200 mAcm$^{-2}$ discharge rate | 220 |
| Marshall[2] | 14M KOH + .15M SiO$_2$ at 33 mAcm$^{-2}$ discharge rate | 263 |
| | 14M KOH without any additives at 33 mAcm$^{-2}$ discharge rate | 48 |

[1] P. C. Foller, "Effect of Additives on the Suspension of Products of Discharge of Zinc in Alkaline Solutions", J. Applied Electrochem., 17, 1296-1303, (1987).
[2] A. Marshall and N. Hampson, J. Electroanal. Chem. 59, (1975) 19.

EXAMPLE 4

In this example, a cell with a cross-section of 80 cm$^2$ of diaphragm was constructed and operated as set out above. FIG. 5 illustrates the discharge of the cell in average current density of 18.8 mA/cm$^2$. After 7.5 Ah, the current density was stepped as shown yielding the voltage/current characteristics set forth in FIG. 6. The rapid return of the cell voltage following these excursions are noted in FIG. 5.

EXAMPLE 5

In this example, a larger cell of cross-section 400 cm$^2$ diaphragm was used. The results are illustrated in FIG. 7 showing the discharge curve at a constant 32 mA/cm$^2$.

What is claimed is:

1. A battery comprising a battery case, a diaphragm disposed in and supported by said battery case, and metal electrode means disposed in and supported by said battery case and including a current feeder, a stationery bed of metal particles adjacent said diaphragm in contact with said current feeder and having an upper and lower end, said metal particles comprising metal on at least the outer surface of said particles, said metal being capable of dissolution in an electrolyte to generate a current in said current feeder, electrolyte outlet means proximal the lower end of said metal particle bed and including openings large enough to pass electrolyte solution but small enough to block passage of said metal particles, electrolyte inlet means for said metal particle bed proximal the upper end thereof, and electrolyte recycle conduit and storage means between said electrolyte outlet and inlet means arranged and positioned for convective flow.

2. The battery of claim 1 in combination with air electrode means disposed in said case on the opposite side of said diaphragm from said metal particle bed.

3. The battery of claim 2 in which said air electrode means is monofunctional.

4. The battery of claim 1 in which said metal is zinc.

5. The battery of claim 1 together with alkaline electrolyte within said battery case circulating through said metal particle bed and electrolyte conduit and storage means.

6. A metal electrode for a battery including a diaphragm in a case, said metal electrode comprising a current feeder, a metal particle bed adjacent to the diaphragm and current feeder, said metal being capable of dissolution in an electrolyte to generate a current in said current feeder, an upper electrolyte inlet to said bed, a lower electrolyte outlet from said bed, means to block the passage of said metal particles through said electrolyte outlet means, and electrolyte conduit and storage means between said electrolyte outlet and inlet openings arranged and positioned for convective flow.

7. In a method for generating electricity in a battery using metal electrode means including a current feeder adjacent one side of a stationary bed of metal particles in a casing, (a) dissolving metal from the surface of said metal particles into said electrolyte to generate a current in said current feeder and form high density metal discharge products in said electrolyte, (b) flowing said electrolyte from step (a) out the lower portion of said metal particle bed while retaining said metal particles stationary in said metal particle bed, and (c) recycling said electrolyte from step (b) in an electrolyte recycle conduit to the upper portion of said metal particle bed, the flow of steps (b) and (c) being at least assisted by convective forces created by a density differential caused by a higher concentration of the high density metal discharge products in the electrolyte at the interstices of the metal particle bed than in the electrolyte recycle conduit.

8. The method of claim 7 in which the flow of steps (b) and (c) is maintained solely by said convective forces.

9. The method of claim 7 in which said metal comprises zinc or a zinc alloy.

* * * * *

UNITED STATES PATENT AND TRADEMARK OFFICE
CERTIFICATE OF CORRECTION

PATENT NO. : 5,006,424
DATED : April 9, 1991
INVENTOR(S) : James W. Evans, et. al.

It is certified that error appears in the above-indentified patent and that said Letters Patent is hereby corrected as shown below:

Title page, item [75], inventor: should read --James W. Evans --.

Signed and Sealed this

Twentieth Day of September, 1994

Attest:

BRUCE LEHMAN

Attesting Officer     Commissioner of Patents and Trademarks